Sept. 6, 1966 F. H. STEWART 3,270,895
AERIAL LOGGING SYSTEM
Filed April 22, 1965 3 Sheets-Sheet 1
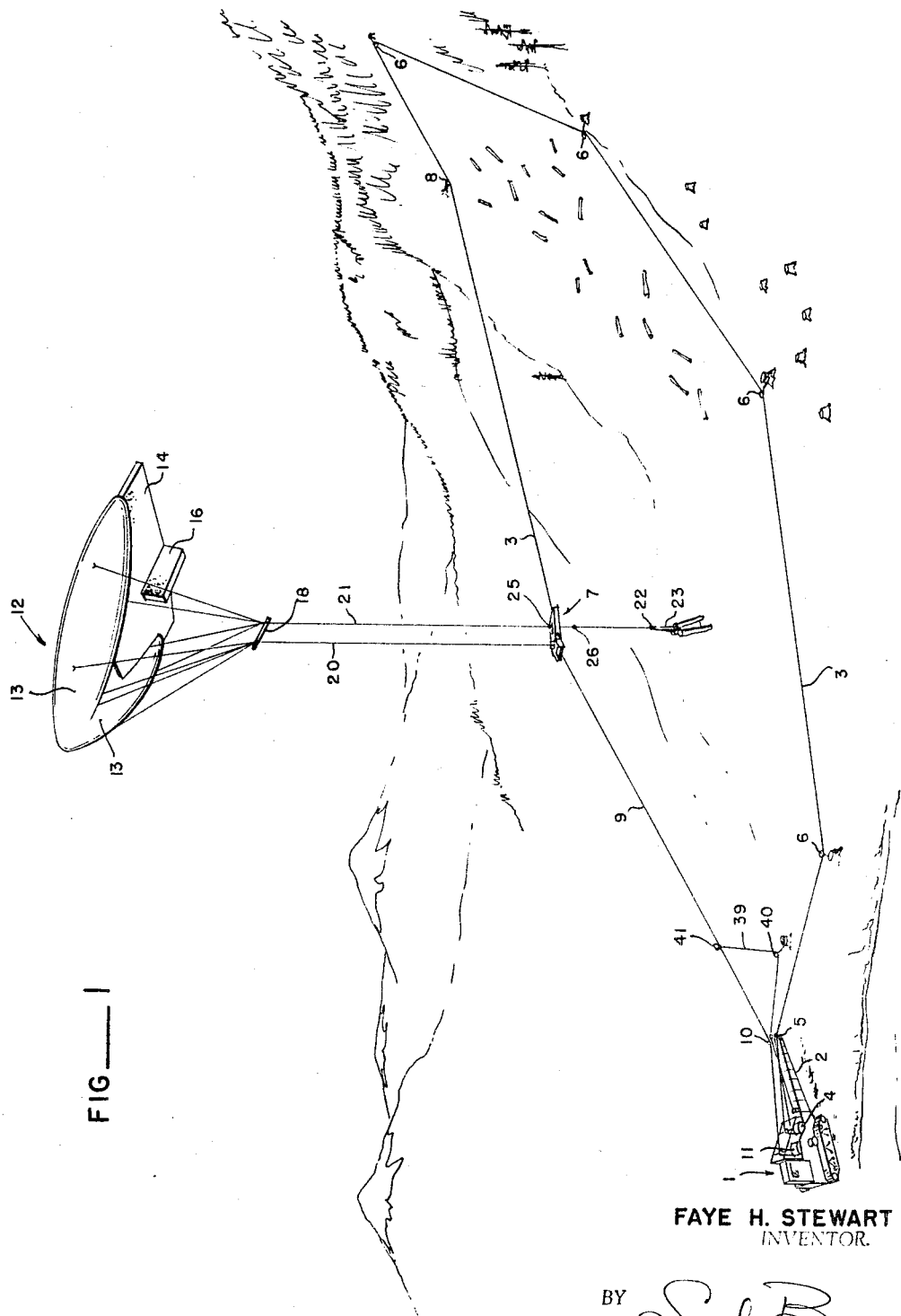
FAYE H. STEWART
INVENTOR.
BY Seed & Berry
ATTORNEYS Sept. 6, 1966    F. H. STEWART    3,270,895
AERIAL LOGGING SYSTEM
Filed April 22, 1965    3 Sheets-Sheet 2
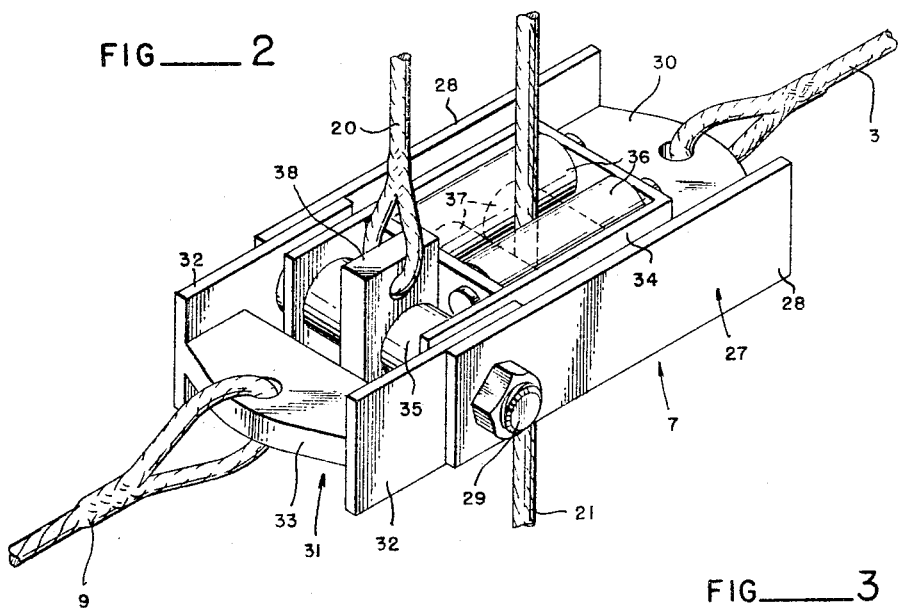
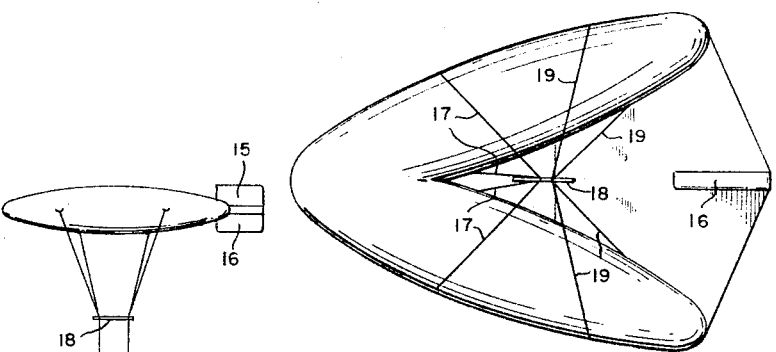
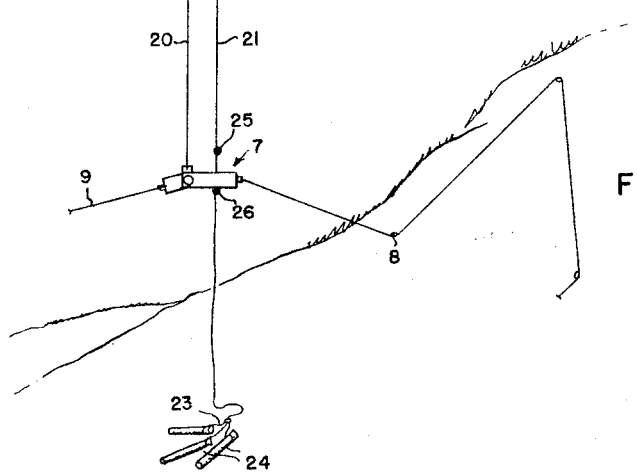
FAYE H. STEWART
INVENTOR.
BY Seed & Berry
ATTORNEYS Sept. 6, 1966 F. H. STEWART 3,270,895
AERIAL LOGGING SYSTEM
Filed April 22, 1965 3 Sheets-Sheet 3
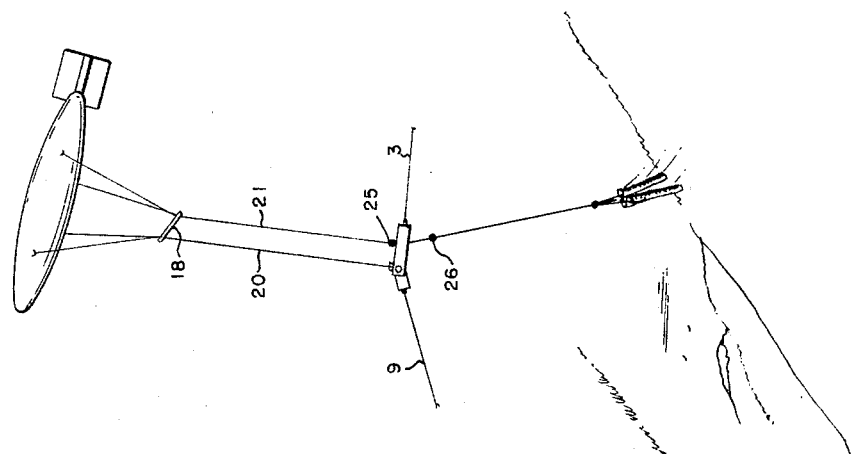
FIG.\_4A
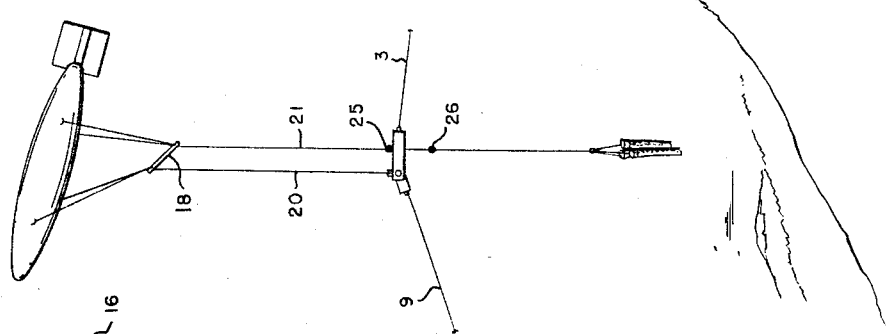
FIG.\_4B
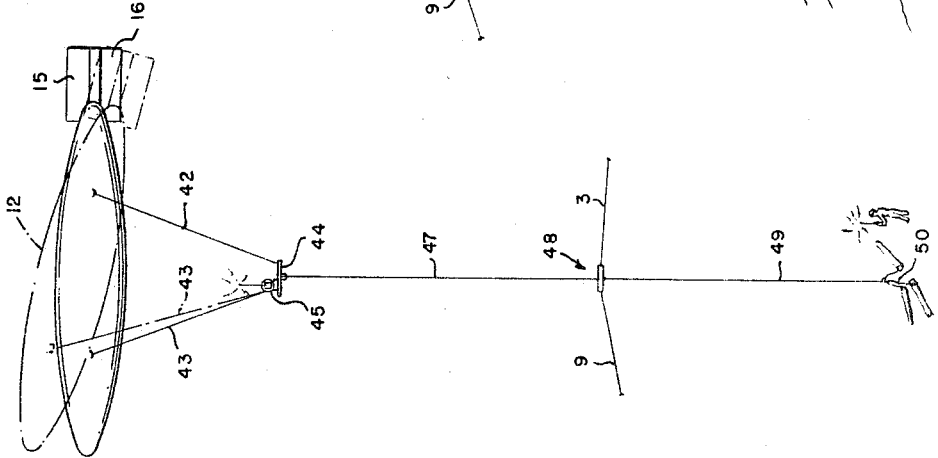
FIG.\_5
FAYE H. STEWART
INVENTOR.
BY Seed & Berry
ATTORNEYS United States Patent Office 3,270,895
Patented Sept. 6, 1966

3,270,895
AERIAL LOGGING SYSTEM
Faye H. Stewart, 2765 Fairmont Blvd., Eugene, Oreg.
Filed Apr. 22, 1965, Ser. No. 450,081
9 Claims. (Cl. 212—71)

The present invention relates in general to logging operations and more particularly to a novel method and rigging apparatus for raising and transporting logs from a logging area to a landing or loading area by use of a lighter-than-air vehicle. According to the concepts of the present invention, a method and system are provided for utilizing not only the static lift of the lighter-than-air vehicle but also aerodynamic lift obtained by controlling the attitude of the vehicle as it is moved, whereby loads, far in excess of its static lifting capacity, may be lifted and transported by the vehicle. With the present system, the amount of aerodynamic lift utilized may be closely controlled to facilitate handling of the vehicle when loaded or unloaded, thus enabling the vehicle to be easily manipulated by ground supported rigging. While the invention is especially adapted for use in logging operations, it will also be understood that, in its broad aspects, the invention is equally adaptable to any cargo or load handling operation of a similar nature.

The primary object of the present invention is, therefore, to provide a load-lifting and transport method and system utilizing a lighter-than-air vehicle whereby loads may be handled with great speed and efficiency over otherwise inaccessible terrain.

Another object of the present invention is to provide a logging method and system of the character described with means to utilize the aerodynamic as well as the static lift of the lighter-than-air vehicle for lifting loads far in excess of the static lift capacity of the vehicle.

Another object of the present invention is to provide a logging method and system of the character described wherein the application of static lift and aerodynamic lift of the vehicle may be closely controlled to facilitate handling of the vehicle both under loaded and unloaded conditions.

A further object of the present invention is to provide a balloon logging system wherein the balloon or lighter-than-air vehicle is tied to a butt rigging by a tethering cable of fixed length and a second load line or cable connects the vehicle to the load and serves to control the attitude of the vehicle.

A still further object of the present invention is to provide a balloon logging system and method wherein the balloon or lighter-than-air vehicle is connected to a load sustaining butt rigging by a single cable with additional means being provided for controlling the attitude of the vehicle to take advantage of dynamic lift of the vehicle.

Other more particular objects and advantages of the present invention will, with the foregoing, appear and be understood from the following description and claims, the invention consisting of the novel construction and adaptation and combination of parts and the combination of method steps hereinafter described and claimed in connection with the preferred embodiment of the invention and a modification thereof. Reference is now made to the accompanying drawings in which:

FIG. 1 is a perspective view of the overall system according to the preferred form of the invention;

FIG. 2 is an enlarged perspective view of the butt rigging for the system;

FIG. 3 is a bottom plan view of the balloon or lighter-than-air vehicle;

FIGS. 4, 4A and 4B illustrate different positions of the vehicle and load line during a lifting operation; and FIG. 5 is a schematic view of a modified form of the system.

Reference is made now to the accompanying drawings which illustrate the method and system according to the preferred embodiment and a modification thereof as applied to logging operations. While the particular system shown is applied to down hill logging for the purpose of illustration, it will be understood that the invention is not restricted thereto. Referring to the preferred embodiment in FIGS. 1 through 4, the system includes a yarder unit indicated generally at 1 which may be of a special design including a generally horizontally extending boom 2 to better facilitate the handling of the various lines of the system. Although a specific yarder and boom design are illustrated in connection with the preferred embodiment of the invention, it will be understood that any number of yarder and boom or yarder and spar tower combinations are adaptable for the present invention and are available in the prior art.

As is conventional in high lead yarding systems, a haulback line 3 extends from a haulback winding drum 4 through a block or sheave 5 at the end of the boom 2 and through a number of corner blocks 6 located in the area to be logged. While conventional logging systems have been limited in the past to yarding distance in the order of approximately 1,000 feet, the present system enables yarding distances to be extended up to several thousand feet without the necessity of road building which is exceedingly costly in comparison to the volume of timber which may be harvested. In the particular system shown, the haulback line 3 is connected at its free end to a butt rigging structure indicated generally at 7 in FIG. 1, the details of which are illustrated in FIG. 2. In addition to the corner blocks 6, it may also be necessary to utilize an additional tail block 8 in the immediate pick up area which acts as a haulback rider block for a purpose later to be described.

Main line 9 is also connected to the butt rigging 7 and extends over a suitable block or sheave 10 carried at the end of the boom 2 and from thence is wound on the main line hauling drum 11 in a conventional manner. It has been found in practice that, with present method and system, much lighter lines may be utilized than heretofore possible. In most instances, a half inch wire rope is sufficient for the main line 9 and the haulback line 3 may be as light as ⅜ inch wire rope.

The lighter-than-air vehicle is indicated generally by the numeral 12 and, in this instance, constitutes a V-shaped gas balloon having two body portions 13 and a rear cross member 14, the undersides of which constitute an aerodynamic lifting surface as will be understood as the specification progresses. The balloon 13 may also include upper and lower fins 15 and 16 respectively on the cross member 14 for the purpose of aligning and stabilizing the balloon in an air stream as will be understood by those skilled in the art. While a specific balloon is illustrated, it will be apparent that many balloon shapes may be utilized as long as the balloon vehicle provides an aerodynamic lifting surface on its under side. The balloon 12 is provided with a bridle system comprised of lines which may be of any character and which are chosen for strength and adaptability to the purpose according to the loads for which the balloon is designed. In the present instance, as seen most clearly in FIG. 3, four forward lines 17 extend downwardly from opposite sides of the two balloon sections and may be secured to the balloon by any such means as a cantinary arrangement, saddle straps or the like. The forward lines 17 extend downwardly to one end of a bungee 18 which, in practice, constitutes an elastic member which may be in the neighborhood of 8 feet in length. In the same manner, the rearward lines 19 extend downwardly from opposite sides of both of the balloon sections 13 and are attached to the opposite sides of both of the balloon sections 13 and are attached to the opposite end of the bungee 18.

Extending downwardly from the forward end of the bungee 18 is a vertical tethering line 20 which is secured at its lower end to the butt rigging 7 as illustrated in FIG. 2. The bridle system for the balloon 12 will be arranged such that the tethering line 20 causes the balloon to maintain a substantially horizontal attitude wherein little or no dynamic lift is normally exerted on the tethering line and the butt rigging 7. Thus, only the static lift of the gas filled balloon 12 is normally applied to the butt rigging 7, with the balloon being restrained normally by the weight of the butt rigging 7 and the drag of the haulback and main line cables. In most instances it is desirable to fly the balloon or vehicle 12 at approximately 500 feet above the butt rigging in order to avoid all obstacles.

Extending downwardly from the bungee 18 at the point of attachment of the rear lines 19 is a load line or load cable 21. The load line 21 passes freely through the butt rigging 7 as illustrated in FIG. 2, and may include a swivel ring or the like 22 attached to its lower end for connecting conventional chokers 23 which are designed to be set on the cut logs 24 to be moved to the landing. In addition, the load line 21 will be provided with a pair of stops 25 and 26 located respectively above and below the butt rigging 7. The stops 25 and 26 may be of any convenient structure and are preferably adjustable along the cable 21 so as to vary the distance therebetween. The stops 25 and 26 preferably include a mass of rubber or other cushion material and are so constructed as to be adjustably fixed at chosen positions on the load line.

Referring now to FIG. 2, the butt rigging 7 may be of varying designs but the preferred construction comprises a first rigid frame indicated generally at 27 which includes the side plates 28 pivoted on the cross pin 29 and a rear cross member 30 to which the end haulback line 3 is secured. Also pivotally mounted on the cross pin 29 is a forward rigid frame 31 having the side plates 32 and a cross member 33 to which is secured the main line 9. Thus the forward and rear frames 27 and 31 may be pivoted individually about the cross pin 29 so as to be relatively movable for a purpose to be described. Also included in the structure of the butt rigging is a central frame comprising a roller cage 34 mounted on a hollow sleeve 35 carried by the cross pin 29. The roller cage 34 serves as a mounting for the two sets of perpendicularly disposed rollers 36 and 37 between which passes the load line 21. Also fixed to the sleeve 35 is a vertical arm 38 for securing the lower end of the tethering cable 20 as illustrated. With this arrangement, it will be apparent that the frames 27 and 31 may be angularly disposed with respect to each other and to the roller frame 34 which is held in a substantially horizontal plane by virtue of the tethering cable 20 and the arm 38. The purpose of the sets of rollers 36 and 37 is that of providing a smooth surface over which the load line 21 may travel as it passes through the butt rigging. The ability of the frames 27 and 31 to pivot about the pin 29 serves to maintain any sharp corners of the frames away from the load line 21 regardless of the angle between the haulback and main line which may become quite acute under certain conditions.

In addition to the rigging described, a guinea line 39 wound on a suitable drum on the yarder is passed through an anchored block 40 and upwardly to the block 41 which rides on the main line 9. The guinea line 39 is fixed to the block 41 for a purpose which will be apparent from the description of the method of lifting, transporting and landing logs which follows.

From the structure described, it will be obvious that, as long as the load line 21 remains unloaded, the tethering line 20 will remain taut maintaining the vehicle in level flight with only the static lift of the vehicle being applied to the butt rigging 7 which will be held elevated above the ground but restrained by the haulback 3 and the main line 9. As soon as a load is placed on the cable 21, the rear end of the vehicle or balloon 12 will be lowered to a degree depending upon the amount of load placed on the line 21 and the spacing between the stops 25 and 26. Thus, loading of the line 21 serves to adjust the attitude of the vehicle so as to cock it to obtain aerodynamic lift when the balloon is moved forward. This action will be well understood by those skilled in the art and is similar to the performance of a kite when placed in an air stream. The amount of angle, from the horizontal, given to the vehicle 12 may also be controlled by means of shifting the positions of the stops 25 and 26 which limit the downward movement of the load line 21 through the butt rigging. In this sense, the butt rigging constitutes a loading device through which the static and aerodynamic lift of the balloon is applied. It has been found in practice that desirable results are obtained by flying the balloon at an angle in the neighborhood of 14° with the horizontal but it will be understood that the exact angle may be varied over a wide range depending upon the performance desired. In this connection, the distance between the stops 25 and 26 may be varied to obtain the proper angle of the balloon under loaded condition which may be determined in the field. Once the attitude of the balloon has been set by a load on the line 21, the balloon is pulled forward by hauling in on the main line 9 to bring the butt rigging to the landing area adjacent the yarder where it is lowered to the proper elevation for landing the logs by hauling in on the guinea line 39.

The steps involved in the preferred method of yarding with the vehicle will now be described in detail with special reference to FIGS. 4, 4A and 4B. As shown in FIG. 4, the balloon has been moved to a pickup position remote from the yarder 1. As aforementioned, the constant static lift of the vehicle 12 is maintained on the butt rigging 7 with the vehicle being restrained by the weight of the butt rigging and the drag provided by the main and haulback lines. In order to obtain the necessary slack in the load line 21 and chokers 23, the haulback rider block 8 is located as near as possible to the particular logs 24 to be yarded. As the haulback 3 is wound in on the drum 4, the butt rigging 7 approaches the rider block 8 and is lowered toward the ground. As the butt rigging is lowered, slack is produced in the load line 21 as illustrated so that the chokers may be set on the logs 24. Referring to FIG. 4A, as soon as the chokers are set, the haulback line is released and the main line is payed in thus immediately moving the butt rigging forward taking up the slack in the load line and chokers. As the load line tightens, it produces a downward pull on the rear end of the vehicle through the lines 19 so as to cock the balloon. The upper stop 25 on the load line determines the limit of travel of the load line through the butt rigging and determines the angle at which the vehicle is set. The application of the load on the vehicle lowers its rear end resulting in immediate aerodynamic lift from the air stream beneath the moving balloon. The balloon immediately aligns itself with the direction of travel of the main line 9 and, as the balloon moves, the logs 24 are lifted as the upper stop 25 contacts the butt rigging as shown in FIG. 4B. The main line 9 may then be hauled in quite rapidly, thus flying the logs 24 toward the landing with the logs being lifted completely off the ground and supported by the aerodynamic lift of the vehicle 12 as shown in FIG. 1.

As the butt rigging 7 and the logs approach the landing, the guinea line 39 may be hauled in thus pulling the main line 9 and the butt rigging toward the ground and landing the logs at a desired position. As the logs come to rest at the landing, the load on the line 21 is relieved allowing the vehicle to return to its substantially horizontal position with only its static lift pulling upwardly on the butt rigging 7. The main line 9, will of course, be halted at the appropriate time in order to properly land the logs. After the chokers 23 have been removed, the guinea line 39 may be payed out to allow the main line 9 to resume its normal position. The vehicle is then ready to be returned to the logging area by hauling in the haulback 3 and paying out the main line 9 to return the butt rigging to the logging area. It may also be noted that, as soon as a pull is exerted by the haulback line 3, the vehicle 12 will come about so as to be directed or headed toward the logging area and will align itself with the pull exerted by the haulback line. As soon as the butt rigging 7 approaches the rider block 8, the haulback 3 is stopped and the chokers 22 may be again set on a new turn of logs because of the slack in the load line 21. As soon as the main line 9 is again hauled in to move the turn to the landing, the vehicle 12 again comes about and is cocked by the application of the load on line 21. It may also be noted that, as the main line 9 is initially hauled in, the vehicle 12 may actually move ahead of the turn of logs as shown in FIG. 4A and, as soon as the aerodynamic lift effect is produced by the aerodynamic lifting surface of the balloon, the turn of logs is immediately swung into the air and flown toward the landing as illustrated in FIG. 4B.

A modified form of cable arrangement between the balloon and the butt rigging is illustrated in FIG. 5 and may be termed a single line system as opposed to the double line system of the preferred embodiment wherein a tethering line was used in addition to the load line. As shown schematically in FIG. 5, the vehicle 12 is provided with a bridle system comprising the line or lines 42 of fixed length and the forward line or lines 43. The lower ends of the lines 42 are connected to a frame or the like 44 which carries a radio controlled winch unit 45 for handling the lines 43 connected to the forward end of the vehicle as illustrated. A single tethering line 47 connects the frame 44 with the butt rigging 48 which, as in the case of the preferred embodiment, is connected between the main line 9 and the haulback line 3. It will be understood that the yarder and ground rigging system for the modified form shown in FIG. 5 is identical with that shown in FIG. 1. The load line 49 is connected at its upper end directly to the butt rigging 48 and is used to connect to chokers or the like 50 for picking up a turn of logs.

The winch 45 is operated by an operator on the ground with a radio transmitter who selectively controls the winch to pay out or haul in on the line 43 to change the attitude of the balloon in order to make use of the aerodynamic lift capabilities of the balloon. Thus, to facilitate moving of the balloon, the bridle system for the vehicle is set by the winch to normally maintain the vehicle in the horizontal attitude with only the static lift of the balloon exerting an upward force on the butt rigging 48 and ground lines. When the balloon has been moved to the pick up area and the butt rigging 48 pulled toward the ground in order to obtain suitable slack in the load line 49, the operator will control the winch 45 so as to pay out additional line allowing the front end of the balloon to elevate the desired amount. As in the preferred embodiment, the main line 9 is then hauled in and the haulback line released, thus exerting the aerodynamic lift of the vehicle through the single line 47, butt rigging 48, and load line 49 to fly the logs to the landing. The landing procedure is substantially the same as in the preferred embodiment in that a guinea line or the like may be used to bring the butt rigging close to the ground in order to land the logs and relieve the load on the line 49. An operator with a transmitter will at this time control the winch 45 so as to haul in the line 43 to again bring the vehicle to a level attitude.

From the foregoing description of the preferred embodiment and modified form of the method and system, it will be obvious to those skilled in the art that a much improved system of logging is provided with many resultant advantages. Among the advantages to be noted is the fact that much lighter cables may be utilized as pointed out, since the only strain placed on the cables is that of the static lift of the vehicle in its unloaded condition and the force of the aerodynamic lift of the vehicle under loaded condition. Thus there is no shock or strain placed on the cables which normally results from dragging the turn of logs through stumps or rough terrain. Another advantage attending the present method and system is the fact that the logs may be yarded at a much more rapid speed than heretofore possible in conventional systems. Likewise, since the logs are not skidded over the ground surface, the present system leaves the logged area in an undisturbed state with no trenches being dug and with the small growth being left intact. Also the present invention permits yarding at greater distances than heretofore possible without the necessity of building roads through rough terrain which constitutes one of the most significant costs in logging operations. It will be readily apparent to those skilled in the art that the present invention provides novel and useful improvements in logging methods and systems as described. The arrangement and types of structural components utilized and the particular method steps described may be subjected to numerous modifications well within the purview of this invention and applicant intends only to be limited to a liberal interpretation of the specification and appended claims.

Having thus described the invention, what is claimed as new and desired to be secured by Letters Patent is:

1. A load transporting system comprising in combination; a lighter-than-air vehicle including an areodynamic lifting surface, a loading device interconnected to said vehicle for applying a load thereto, means for controlling the relative distances between opposite ends of said vehicle and a horizontal plane passing through said loading device for controlling the attitude of said vehicle, and means to move said loading device in a direction to selectively apply the aerodynamic lifting force of said surface to said loading device.

2. A yarding system comprising; a lighter-than-air vehicle, said vehicle including an aerodynamic lifting surface, a loading device, bridle means connected to the front and rear ends of said vehicle, means to connect said loading device to said bridle means so as to apply the static lift only of said vehicle to the loading device, means associated with said bridle means to control the relative distances between the front and rear ends of said vehicle and a horizontal plane passing through said loading device for controlling the horizontal attitude of the vehicle, and means to move said loading device in a direction to utilize the aerodynamic lifting force of said lifting surface for lifting said loading device.

3. In a yarding system, the combination comprising: a butt rigging, a haulback line, a main line, said haulback and said main line being connected to said butt rigging, winding drum means for hauling in and paying out said haulback and main lines, a lighter-than-air vehicle, said vehicle including an aerodynamic lifting surface, tethering cable means connecting said vehicle to said butt rigging for applying the static lift of the vehicle thereto, load cable means connected to apply a downward force adjacent one end of said vehicle when a load is attached thereto and extending downwardly and passing freely through said butt rigging, a first stop means fixed to said load cable means above said butt rigging and a second stop means fixed to said load cable means below said butt rigging, and choker means for connecting the lower end of the load cable means to a turn of logs, whereby a load on said load cable means will cock said vehicle to apply aerodynamic lift to said butt rigging as the main line is hauled in to move the load to a landing.

4. In a yarding system, the combination comprising; a butt rigging, a haulback line, a main line, said haulback and said main line being connected to said butt rigging for moving the same in either direction, winding drum means for hauling in and paying out said haulback and main lines, a lighter-than-air vehicle, said vehicle including an aerodynamic lifting surface, a bridle system for said vehicle including a first set of lines connected to one end of said vehicle and a second set of lines connected to the other end of said vehicle, a tethering cable connected to said butt rigging and to said bridle system, means for selectively changing the configuration of said bridle system for controlling the horizontal attitude of the vehicle, and means to connect a load to said butt rigging.

5. The combination according to claim 4 wherein; said bridle system includes means connecting said second set of lines to said tethering cable, said means for changing the configuration of said bridle system comprising means connected between said first set of lines and the upper end of said tethering cable for selectively adjusting the length of said first set of lines.

6. The combination according to claim 5 wherein, said last mentioned means comprises a radio controlled winch device.

7. In a load transporting system having a lighter-than-air vehicle, a tethering line for said vehicle, main and haulback lines, and a load line connected to said vehicle, a butt rigging comprising; first and second frame members having laterally spaced arms, pivot means connecting the respective arms of said frame members, one of said frame members being connected to the main line and the other being connected to the haulback line, a cage pivotally mounted on said pivot means and connected to said tethering line, said load line passing through and being guided by said cage.

8. The device according to claim 7 wherein, said first and second frame members are generally U-shaped forming said laterally spaced arms and connecting means for said main and haulback lines, said cage being mounted between the arms of said frame members and including crank arm means connecting said tethering line thereto at a point above the axis of its pivotal mounting.

9. The device according to claim 8 wherein said cage includes first and second vertically spaced pairs of parallel guide rollers, the axis of said first and second pair of rollers being at right angles, and said load lines passing between the rollers of each said pairs, whereby said cage and said load line are unaffected by angulations between said main and haulback lines.

References Cited by the Examiner

UNITED STATES PATENTS 3,055,622 9/1962 Harmon _____ 244—153
3,221,897 12/1965 Matheson _____ 212—71

FOREIGN PATENTS 12,251 6/1894 Great Britain.
165,262 11/1958 Sweden.

OTHER REFERENCES

"Giant Balloons May Change Course of Logging Industry," vol. 23, No. 6, The Wingfoot Clan: Goodyear Aerospace Corporation, March 12, 1964.

Century Magazine, vol. 54, May 1897, Library of Congress, AP 2 C4 (pages 84–89).

EVON C. BLUNK, *Primary Examiner.*

A. L. LEVINE, *Assistant Examiner.*